Aug. 1, 1961 A. J. GORAND ET AL 2,994,383

FIRE PROTECTION SYSTEM

Filed Feb. 13, 1959 4 Sheets-Sheet 1

INVENTORS
ALFRED J. GORAND
CHARLES H. BROOKS
BY Robert O. Spindle
ATTORNEY

INVENTORS
ALFRED J. GORAND
CHARLES H. BROOKS
BY
ATTORNEY

INVENTORS
ALFRED J. GORAND
CHARLES H. BROOKS
BY Robert O. Spindle
ATTORNEY

INVENTORS
ALFRED J. GORAND
CHARLES H. BROOKS
BY Robert O. Spindle
ATTORNEY

United States Patent Office — 2,994,383 — Patented Aug. 1, 1961

2,994,383
FIRE PROTECTION SYSTEM

Alfred J. Gorand, Ridley Park, and Charles H. Brooks, Swarthmore, Pa., assignors to Sun Oil Company, Philadelphia, Pa., a corporation of New Jersey Filed Feb. 13, 1959, Ser. No. 793,053
13 Claims. (Cl. 169—16)

This invention relates to a fire protection system, and more particularly to an arrangement or system for protecting elevated (tall) objects (e.g., vessels, structures, or equipment) from damage by radiation from a fire. Speaking generally, the purpose of this invention is to provide a means of fire protection for tall vessels, towers, etc., together with their supporting structures, and also for elevated structures supporting other types of equipment, together with the equipment supported in such elevated structures.

It is a well-established fact that if a curtain of water can be provided around or on the surface of buildings or structures, the buildings or structures will be protected from fire damage. This protection occurs due to the fact that radiant heat from a nearby fire will be hindered in reaching the object (building or structure), since it will be absorbed by the intervening water. The heat so absorbed will heat the water and, if of sufficient intensity, will vaporize a portion of the water. All of this will occur without the material of the building or structure (object) reaching a temperature higher than that of the boiling point of water.

Most, if not all, previous arrangements known to us for accomplishing the aforementioned result (i.e., for providing a curtain of water around or on the surface of an elevated object desired to be protected) have called for a permanent (pipe-type) connection to a water supply system. Such arrangements all have the disadvantage that the permanent connection must be installed and maintained. In addition, great care must be exercised that systems of this type either be kept completely free of water at all times when not in use, or that provision be made to prevent freezing in cold weather. Thus, severe maintenance problems arise with such arrangements.

There has previously been proposed, ostensibly for accomplishing the aforementioned result, a device which does not require a permanent connection to a water supply system, this device being supplied with water by means of a fire hose. However, this device would involve very extensive maintenance, in order to keep it from becoming completely inoperative or ineffective. In addition, it would be applicable only to vessels and structures having straight, vertical walls. Furthermore, the fire nozzle or hose would have to be in direct line with the fire, in order to have the stream of water impinge on the device in the proper direction to produce a curtain effect; with the nozzle so located, the same will be practically inaccessible or unusable just at the time when the high pressure stream of water is needed.

An object of this invention is to provide a novel system for protecting tall vessels, elevated structures, or elevated equipment, as well as flat surfaces, from damage by fire radiation.

Another object is to provide a fire protection system for elevated objects, which system does not require the installation of permanent connections to a water supply system.

A further object is to provide a fire protection system for elevated objects, which system requires no maintenance whatever, once it is installed.

Still another object is to provide a fire protection system for elevated objects, which system does not require the stream of water to originate from a point close to the fire, or between the fire and the protected object.

The objects of this invention are accomplished, briefly, in the following manner; a suitable nozzle is attached either to a conventional fire hose or to a conventional monitor nozzle stand. The hose or stand is supplied from a high pressure water source, to provide a stream of water from the nozzle. The stream from the nozzle is collected by a hollow guiding member or "chute," which receives the water in the stream and guides the water into a distribution system consisting of pipes with openings therein, the pipes and openings being so arranged that water will emerge from the openings and impinge on or flow in the form of a curtain over the surface of the building, structure, vessel, or equipment which it is desired to protect.

A detailed description of the invention follows, taken in conjunction with the accompanying drawings, wherein.

Figures 1, 2, 3, 4:
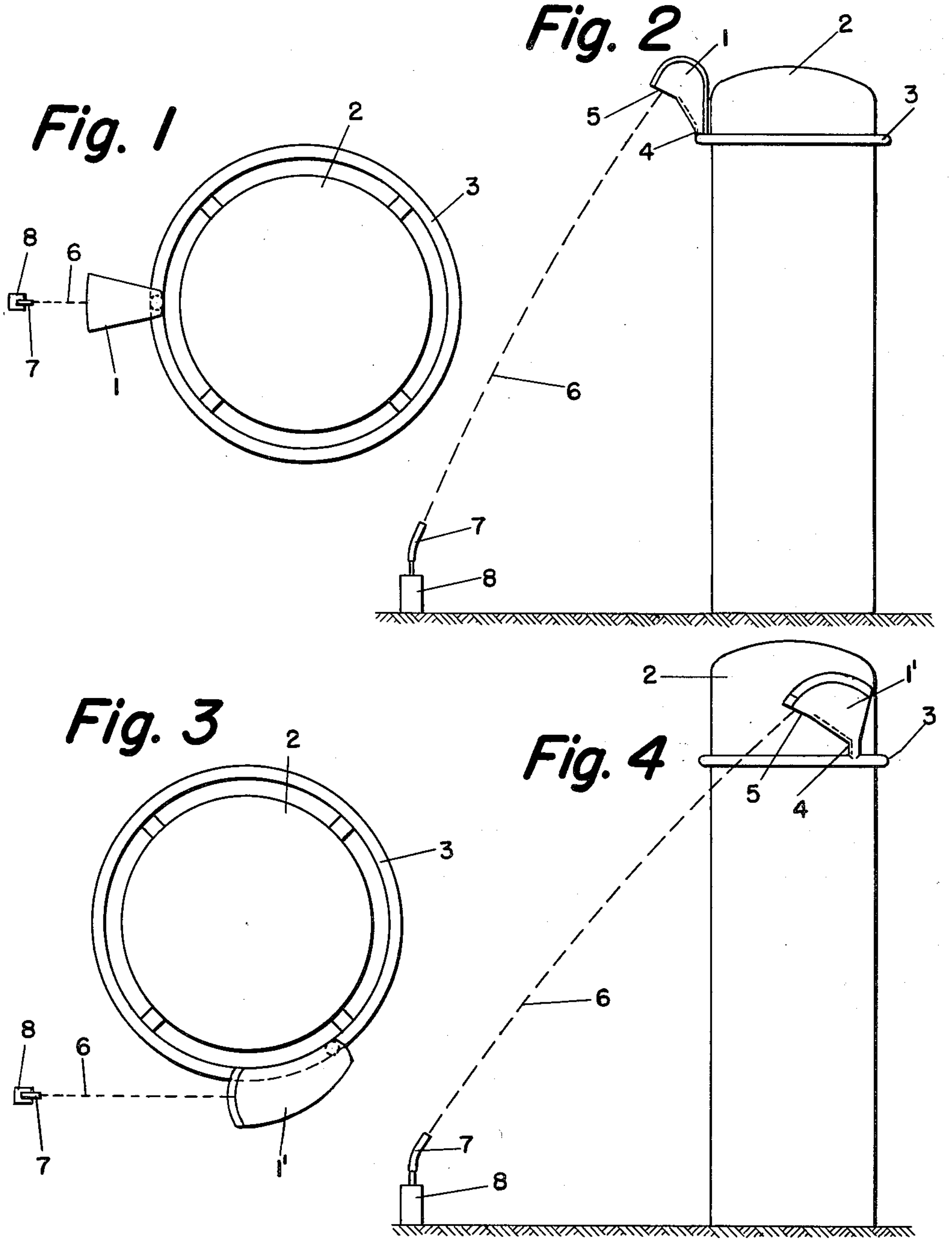
FIGURES 1 and 2 are views diagrammatically illustrating a fire protection system according to this invention, using one form of chute.
FIGURES 3 and 4 are views similar to FIGURES 1 and 2, but using a modified form of chute.

Table I, following, gives data representing certain characteristics of water streams from high pressure nozzles. The data given are for what are known as "good" nozzle streams, a "good" stream being defined as a "solid stream that has lost no more than 15% of its total volume" when it reaches the coordinates as given in Table I.

*Table I*

| Horiz. Dist. (ft.) | Vertical Height in Ft. at Indicated Nozzle Pressure | | | | |
|---|---|---|---|---|---|
| | 100 p.s.i.g. | 90 p.s.i.g. | 80 p.s.i.g. | 70 p.s.i.g. | 60 p.s.i.g. |
| **1½" NOZZLE** | | | | | |
| 10 | 109 | 100 | 92 | 84 | 77 |
| 20 | 108 | 98 | 90 | 83 | 76 |
| 30 | 107 | 97 | 88 | 82 | 74 |
| 40 | 104 | 95 | 87 | 79 | 71 |
| 50 | 101 | 92 | 84 | 77 | 68 |
| 60 | 98 | 88 | 80 | 73 | 65 |
| 70 | 93 | 84 | 76 | 68 | 60 |
| 80 | 88 | 78 | 70 | 62 | 54 |
| 90 | 81 | 71 | 63 | 55 | 47 |
| 100 | 73 | 64 | 55 | 48 | 39 |
| **2" NOZZLE** | | | | | |
| 10 | 112 | 104 | 97 | 89 | 80 |
| 20 | 111 | 103 | 96 | 88 | 79 |
| 30 | 110 | 102 | 95 | 86 | 77 |
| 40 | 109 | 100 | 92 | 84 | 74 |
| 50 | 107 | 98 | 90 | 81 | 72 |
| 60 | 103 | 95 | 87 | 78 | 68 |
| 70 | 99 | 91 | 83 | 74 | 64 |
| 80 | 95 | 87 | 79 | 69 | 59 |
| 90 | 90 | 82 | 73 | 63 | 53 |
| 100 | 85 | 76 | 67 | 57 | 46 |

To round out the above table, the discharge values, in gallons per minute, for a 1½" nozzle are: at 100 p.s.i.g., 667; at 90 p.s.i.g., 633; at 80 p.s.i.g., 596; at 70 p.s.i.g., 558; at 60 p.s.i.g., 517. The discharge values for a 2" nozzle are, in order, for the same respective nozzle pressures: 1189, 1128, 1063, 994, 920.

The coordinates given in Table I are abstracted from the National Fire Protection Association Handbook, eleventh edition, FIGURES 1401–A and 1402–A; the discharge values given in the paragraph immediately preceding are taken from FIGURE 1416 of the same book.

From Table I, it may be seen that, with conventional water pressures which exist in normal fire mains (100 p.s.i.g. or above), it is possible to project a water stream so as to reach vessels and structures from ground level to a point 70 to 100 feet above the ground, and thus it would be possible to protect adequately this region. The said protected region covers the area where it would be expected that serious damage could result, under normal circumstances.

It is well known that the trajectory of a jet of water, in air, is parabolic in form, in its early stages. This is not true with the later stages of a jet, due to the effect of air resistance; in addition, due to air friction, the jet tends to break up. However, we are here concerned only with the early stages of the trajectory.

By calculation, it is possible to develop a set of curves which give the horizontal and vertical distances of the end of the "good" stream or jet, as a function of the angle of the nozzle above the horizontal. From the same calculations, the angle of the path of the stream with the horizontal, at the point at which the stream is no longer "good," may be determined as a function of the angle of the nozzle above the horizon.

The results of the calculations for a 1½" nozzle, with a nozzle water pressure of 100 p.s.i.g., are given in Table II, following.

*Table II*

| Horiz. Distance, feet | Vertical Distance, feet | Nozzle Angle, Degrees Elev. | Stream "End" Angle, Degrees Elev. |
|---|---|---|---|
| 10 | 109 | 86 | 85 |
| 20 | 108 | 81 | 79 |
| 30 | 106 | 76 | 72 |
| 40 | 104 | 72 | 67 |
| 50 | 101 | 68 | 60 |
| 60 | 98 | 63 | 55 |
| 70 | 93 | 58 | 47 |
| 80 | 87 | 53 | 40 |
| 90 | 81 | 48 | 32 |
| 100 | 73 | 43 | 24 |

According to this invention, the stream of water projected upwardly from a fixed nozzle is received or collected by a hollow guiding member or "chute" mounted in an elevated position adjacent (preferably at or near the top of) the object to be protected. The chute guides the water into an elevated distribution pipe or distribution system, the latter being provided with openings therein. The positions of the distribution pipe or pipes, and of the openings, are such that water emerging from the openings will form a curtain of water around or over the surface of the object to be protected.

The location of the end of the "good" stream, as given in Table II above, is important with regard to the location of the nozzle and of the chute. The angle of the axis of the stream at the end of its "good" path (as also given in Table II) is important with regard to the design of the collecting (receiving) chute.

The design of a chute according to this invention is dependent upon two fundamental principles, which will now be stated. The first is that the angle of incidence of the stream with the plane of the inlet aperture of the chute should be 90°, or, in other words, the plane of the inlet aperture should be normal to the axis of the stream, at the point of entry of the latter into the inlet aperture. The second is that the shape of the chute, in general, should be parabolic, so that the entire stream which enters the chute will be reflected through a given point in space, which point would of course be the focus of the parabola.

The detailed principles governing the design of the chute will now be outlined. First, the shape should be such that splash or spatter is minimized. In other words, the surfaces upon which the stream of water impinges should either be curved or, if flat, should be as close to tangent to the path of the water as possible. Second, the inlet aperture should be normal to the axis of the stream, at the point of entry of the latter into the chute inlet aperture. Third, the outlet from the chute should preferably be vertical, that is, the outlet aperture of the chute should lie in a horizontal plane, when the chute is in its operative position, adjacent the object to be protected. Fourth, the outlet aperture of the chute should be of a size (cross-section) such as to handle the entire flow of water from the nozzle, at normal pipeline velocities. Fifth, the portion of the chute where it would be expected that the stream would strike should be parabolic in shape (see the "first" principle above). Sixth, the axis of the parabola should be parallel to the axis of the stream, at the point of entry of the latter into the chute inlet aperture. Seventh, the parabolic portion of the chute should be of the shape that is produced by the rotation of a parabola about its axis; in other words, it should be a section of a paraboloid. A paraboloidal reflector directs all parallel incoming "rays" through the focus of the parabola. Eighth, the inlet aperture should be so located that any expected splash from the stream will fall inside of the chute. This means that, preferably, the focus would be located a substantial distance inside of the hollow chute and below the lower edge of the inlet aperture. In other words, the axis of the paraboloid should pass below the lower edge of the inlet aperture, or between the inlet and outlet apertures. Ninth, the size of the chute inlet aperture should be such that it forms an adequate target for the stream from the nozzle. This aperture should have a minimum dimension on the order of 5% of the straight line distance from the nozzle to the inlet aperture of the chute.

The outlet aperture of the chute is coupled to a distribution pipe of such a size that the velocity of water through it at its inlet will be on the order of two to four feet per second, a figure comparable to that used, under good engineering practice, for suction lines to pumps. In this connection, see the "fourth" principle in the preceding paragraph. It should be noted that, as soon as the water reaches the section of the distribution pipe where the openings exist for delivering the water against the surface to be protected from fire damage, the velocity through the pipe will decrease, in a manner which can be calculated. The distribution system is so designed as to provide a substantially constant pressure head throughout such system. For this, the total cross-section of all the openings should be less than the cross-section of the pipe. It is entirely possible with long distribution lines, such as would be used to protect an elevated structure with its contained equipment, that line (pipe) sizes would change, at various points in the distribution system.

The chute referred to, which forms an essential part of the fire protection system of this invention, may be located anywhere that a satisfactory support may be provided. It may be located so that it is supported by the building, vessel, or structure (i.e., the object) which is to be protected. It may also be located at a point remote from an individual structure, vessel, building, or equipment to be protected. In the latter case, the distribution line (coupled to the chute outlet aperture) would lead the water over to the object which is to be protected.

The system of the present invention, employing as it does a chute which guides the water with a minimum of splash to an enclosed distribution pipe or distribution system, permits the maximum efficiency of use of water for the protection of tall vessels, elevated structures, and elevated equipment from damage by fire radiation.

Protection of an elevated supporting structure (as distinguished from vessels, buildings, and equipments) by means of merely a water stream projected from a nozzle directly onto such structure is difficult, because of the small target presented and the consequent relatively low efficiency of use of the water. The system of this invention, on the other hand, permits such structures to be adequately protected with a maximum efficiency in the usage of water. This particular feature will become more clearly apparent hereinafter.

In general, towers or vessels which are to be protected from fire are circular in cross-section, that is, they are cylindrical. FIGURES 1 and 2 are, respectively, a plan or top view and a side elevation of a fire protection system according to this invention, as installed to protect a tall cylindrical vessel; this system utilizes the basic form of chute which will be described in detail hereinafter. The chute 1 is mounted in an elevated position adjacent (directly in front of) the tall cylindrical vessel 2. Since it is never known from which direction fire exposure will come, it is desirable to have the protection extend completely around the vessel. This can be accomplished by means of a (distributing) ring of pipe 3 completely surrounding the vessel 2 at a point somewhat below the (restricted) outlet aperture 4 of the chute. This ring 3 is normally supported from the vessel 2 to be protected, and the chute 1 is in turn attached to ring 3.

The elevated distribution pipe 3 is coupled to the outlet aperture 4 of chute 1, so that the water guided to the oulet aperture 4 flows downwardly into pipe 3. Arranged at the bottom of the distribution pipe ring 3, but directed at an angle such that the jets emerging from the openings will impinge on the vertical cylindrical surface to be protected, are a plurality of openings proportioned so that there will be a substantially uniform flow from all openings around the ring. By way of example, the openings may be about six inches apart, around the ring. Additional details concerning these openings will be provided hereinafter, in connection with FIGURES 5 and 6. The substantially uniform flow from all the openings results in the production of a curtain of water which flows downwardly over the cylindrical surface of vessel 2 and adequately protects the vessel from damage by radiation from the fire. The water curtain does not have to be absolutely continuous in order to provide the desired protection from damage by fire.

The hollow chute 1 has its (enlarged) inlet aperture 5 facing downwardly, in position to provide a target for, and to receive, a solid stream 6 of water (whose expected axis is indicated in dotted lines) which can be projected upwardly from a so-called "monitor" fire nozzle 7. Nozzle 7 is mounted on a monitor stand 8 at ground level, this monitor stand being coupled to, and supplied by, a source of high pressure water, for example a fire main. The high pressure water stream 6 is projected upwardly into the inlet aperture 5 of the chute, and this chute acts to guide the water downwardly (and also inwardly, with respect to vessel 2) to outlet aperture 4, from whence it flows into distribution pipe 3 to provide a curtain of water over the cylindrical surface of vessel 2, in the manner previously described.

There has been described, in somewhat general terms, a fire protection system (including chute 1) which will deliver water to an elevated point (pipe ring 3, on vessel 2) without having any permanent, or even temporary, conduit between the elevated point and the source of water, which latter normally would be expected to be at ground level, although not necessarily so. Of course, if the nozzle 7 were itself mounted on an elevated structure (which might be necessary, for example, if protection for a still taller object were desired), suitable precautions would have to be taken to prevent freezing in the aboveground high pressure fire mains. In addition, there has been described, in somewhat general terms, the design of the distribution system for the water, once it has been delivered to the elevated point.

In many cases, it might be desirable to have several monitor stands and nozzles around the area to be protected, and more than one chute per vessel, each such chute being arranged to receive a stream of water from a respective fire nozzle. These could be arranged in such a manner that at least one monitor nozzle, or nozzle on the end of a fire hose, would be accessible and usable, no matter from which direction the first exposure comes. Thus, it would not be necessary for the stream of water to originate from a point close to the fire. FIGURES 3 and 4 are, respectively, a plan or top view and a side elevation of a fire protection system utilizing a modified design of chute, as installed to protect a tall cylindrical vessel. This modified design of chute will be described in detail hereinafter, and may be used when it is more convenient to locate the chute directly on the side wall of a tall (cylindrical) vessel. Chute 1' is mounted in an elevated position immediately adjacent to and on the side wall of vessel 2. As in FIGURES 1 and 2, distributing pipe 3 is in the form of a ring completely surrounding vessel 2, the ring being supported from vessel 2. Chute 1' may be attached to ring 3, or it may be attached directly to vessel 2. Distribution pipe 3 is coupled to the outlet aperture 4 of chute 1'. The high pressure water stream 6 from nozzle 7 is projected upwardly into the inlet aperture 5 of chute 1', and this chute acts to guide the water downwardly and inwardly to outlet aperture 4, from whence it flows into distribution pipe 3 to provide a curtain of water over the cylindrical surface of vessel 2, just as in FIGURES 1 and 2.

Consideration will now be given, in a general way, to the arrangement of the distribution pipe or pipes for protecting horizontal vessels or other equipment, and for protecting supporting structures. First, for horizonal vessels or other equipment, a vertical curtain of water is not really needed. Adequate fire protection will be provided if water is applied to the top of the vessel or equipment. Water so applied will run down over the surface of the equipment or vessel, and will provide the protection desired. Second, if a supporting structure is to be protected, the structural members (i.e., the columns and the beams) must be considered. From the principles of heat transfer, it is only necessary to provide one stream of water against each such column. There would be no real necessity for a curtain. As far as the beams are concerned, provision would have to be made for a spider or grid designed similarly to the ring for the tall vessel (see FIGURES 1–4), so that water could be sprayed on these structural members from one side, preferably the top, but not necessarily so.

FIGURES 5–9 illustrate the details of design of the distribution pipe or pipes for various types of surfaces. It should be noted that the principles of design are the same regardless of whether the distribution system for conveying the water from the outlet of the chute to the point of application be a ring (as in FIGURES 1–4), a grid, or a series of lines to protect the columns and beams of a supporting structure, or to protect horizontal vessels. The basic principle in all of these systems is that the openings in the distribution pipe are located at the bottom of the pipe. This is to assure drainage, which will result in two things, one being no rusting as a result of water remaining in the pipe, and the other being no blocking of the openings by reason of ice in cold weather. To permit the direction of the jet against a vertical surface, whether this be the wall of a vessel, or other object which is to be protected, it will be necessary for the axes of the openings to be at an angle with the vertical diameter of the pipe, at the bottom of the pipe.

Figure 5:
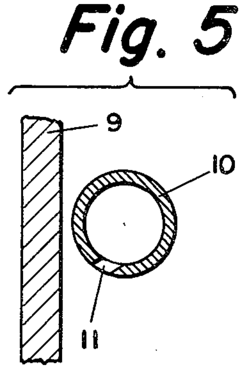
FIGURES 5–9 are views illustrating various types of distribution pipes.

FIGURE 5 is a partial cross-section, taken on a vertical plane, illustrating one design of a distribution pipe for the application of the protective curtain of water against a vertical surface. In this figure, vertical wall 9 is the surface which is to be protected. A distribution pipe 10 runs horizontally along and adjacent to wall 9, near the top of this wall. Pipe 10 has a plurality of spaced openings therein, one of which is shown at 11. These openings are located at the bottom of the pipe 10, with their axes at an angle with the horizontal and at an angle with the vertical diameter of the pipe; the openings point toward wall 9. The openings may be about six inches apart along the length of pipe 10, by way of example.

Figure 6:
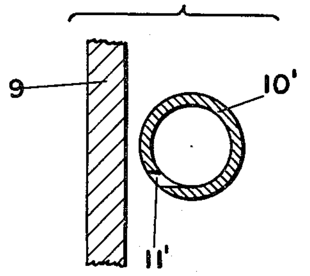

FIGURE 6 is a view similar to FIGURE 5, illustrating a modified design of distribution pipe for the protection of vertical surfaces. Distribution pipe 10' runs horizontally along and adjacent to vertical wall 9, near the top of this wall. Pipe 10' has a plurality of spaced openings 11' therein, located at the bottom of pipe 10'. The axes of openings 11' are horizontal and at a right angle with the vertical diameter of the pipe 10', and the openings point toward wall 9. The lower edges of openings 11' are tangent to the bottom of the pipe 10'.

The design shown in FIGURE 5 is generally preferred for the protection of vertical surfaces, although the design shown in FIGURE 6 is reasonably satisfactory.

Figure 7:
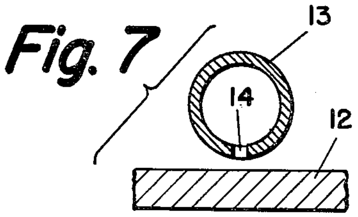

FIGURE 7 is a partial cross-section, taken on a vertical plane, illustrating the design of a distribution pipe according to this invention, as it would be applied to the protection of horizontal surfaces. Horizontal wall 12 is the wall of the vessel or equipment, the surface of which is to be covered with the protective water. The distribution pipe 13 runs horizontally along and adjacent to wall 12, just above the upper surface of this wall. Pipe 13 has a plurality of spaced openings 14 therein, located at the bottom of the pipe and directly over the upper surface of wall 12. The axes of these openings may coincide with vertical radii of the pipe. Water in pipe 13 will emerge from the openings 14, and run down over the horizontal wall 12 to provide the desired protection.

It should be noted that FIGURE 7 is the preferred arrangement of openings for the protection of horizontal surfaces, but openings positioned at an angle of as much as 45° with the horizontal would still be effective for the purposes of this invention.

Figure 8:
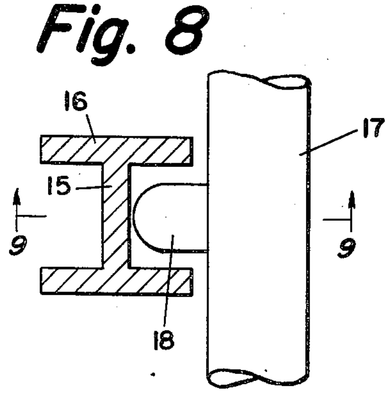
Figure 9:
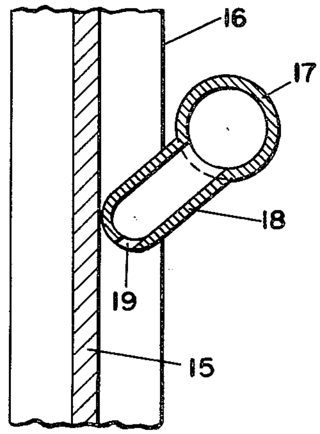

FIGURE 8 is a top or plan view illustrating the design of a distribution pipe for the protection of vertical structural members, such as the columns of an elevated structure; FIGURE 9 is a section taken along line A—A of FIGURE 8. Numeral 15 denotes the web portion of the H-shaped column to be protected, while numeral 16 denotes the flange portion of this column. A distribution pipe 17 is positioned horizontally near the top of the column, closely adjacent to the outer end of the flange portion 16. An extension 18 is attached to pipe 17 at a location therealong which is aligned with the web portion 15, this extension projecting inwardly (and also downwardly, see FIGURE 9) to a point closely adjacent web portion 15. Extension 18 is hollow, and the interior thereof communicates with the interior of pipe 17. An opening 19 is provided in the lower end of extension 18, the opening thus being in the bottom of pipe 17; this opening points toward web portion 15 of the column. Preferably, the lower end of opening 19 is tangent to the lower wall of extension 18. The purpose of extension 18 is to move the opening 19 adjacent to web portion 15; in general, with tall structures, the dimensions of the columns would be such that it would be difficult to provide a design such that a jet from an opening in pipe 17 could be counted upon to impinge on the surface of web 15. With the arrangement of FIGURE 8, water emerging from opening 19 in extension 18 provides one stream of water directly on the surface of web 15, and thus provides the desired protection for the structural column.

Figure 10:
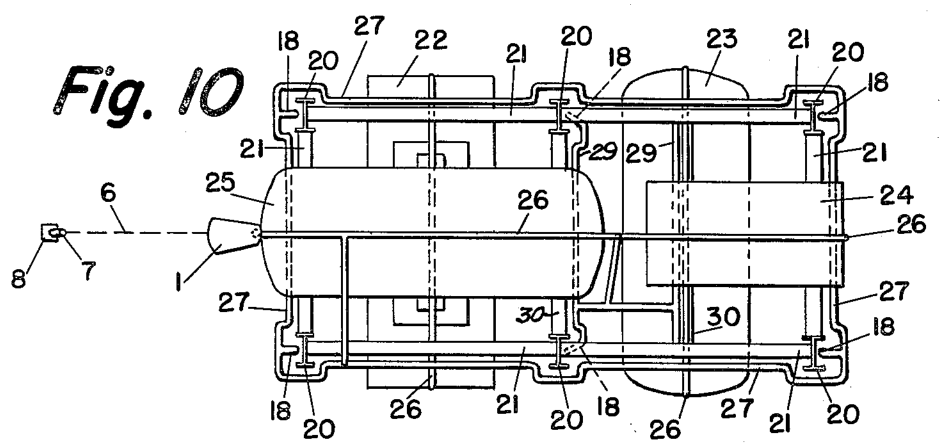
FIGURES 10 and 11 are views illustrating the fire protection system as applied to the protection of an elevated structure and the equipment mounted thereon.
Figure 11:
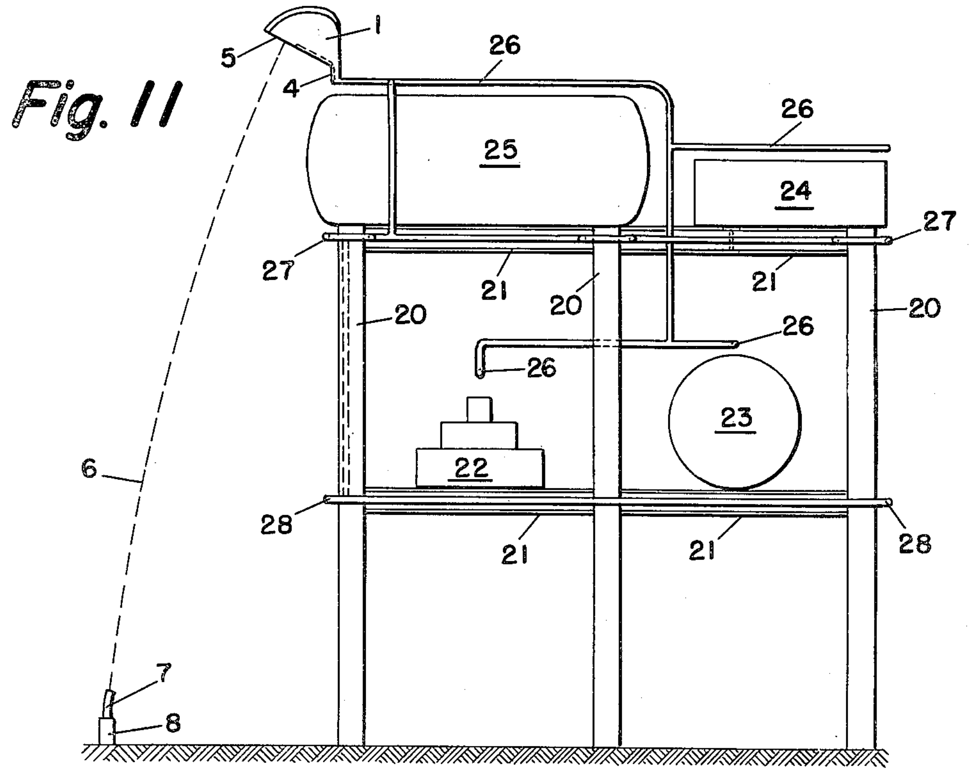

FIGURES 10 and 11 illustrate, diagrammatically, the system of this invention as it would be used to protect an elevated structure containing assorted equipment, employing the basic form of chute previously referred to in connection with FIGURES 1 and 2. FIGURE 10 is a top or plan view of the system and FIGURE 11 is a side elevation of the system.

The elevated structure illustrated consists of vertical columns 20 and horizontal beams 21. This structure, as illustrated, may provide two levels as shown, or more, on which are mounted various pieces of equipment. A first piece of equipment 22, for example a compressor unit, is mounted on the lower level of the structure. A second piece of equipment 23, illustrated as a cylindrical vessel with end bells, is also mounted on this lower level. A third piece of equipment 24, illustrated in the shape of a rectangular prism, is mounted on the upper level. A fourth piece of equipment 25, illustrated as another cylindrical vessel with end bells, is also mounted on the upper level of the structure. As in FIGURE 1, reference numeral 1 denotes a collecting chute mounted at the top of the structure, directly in front thereof. This chute has a downwardly-facing open inlet aperture 5, which is located outwardly from and above the chute outlet aperture 4. Numeral 8 denotes the monitor stand to which is attached the nozzle 7. Numeral 6 denotes the expected axis of the water stream from nozzle 7 to chute 1.

Numerals 26 denote the various distribution pipes which would be used to apply the protective water to the equipments 22, 23, 24, and 25, using the principles previously described (see FIGURE 7) for the protection of horizontal surfaces. The uppermost one of the pipes 26 (which can be considered as feeding the entire distribution system) is coupled to the outlet aperture 4 of chute 1. Numerals 27 indicate the upper distribution system used to protect the upper structural members 20 and 21, using the principles previously described in connection with FIGURES 5 and 8; numerals 18 indicate the extensions previously shown in FIGURES 8 and 9. Numerals 28 indicate the lower distribution system, used to protect the lower structural members 21. Numerals 29 denote the distribution pipes used to protect the interior beams such as 30 of the structure, used primarily for individual support of the equipment installed in the structure.

It may be observed that the system of distribution pipes illustrated in FIGURES 10 and 11 comprises a manifold system with multiple, parallel streams. The system is a combined vertical and horizontal manifold. Each stream will differ not only in quantity, but also in the hydraulics involved in its flow. Conventional methods of engineering design can be used to properly proportion the various flows in the distribution system. For example, correctly sized orifices at the inlet to each branch of the manifold will be satisfactory.

The manner of operation of the distribution system disclosed in FIGURES 10 and 11 may be readily understood, it is believed, from the foregoing description.

It may be seen, in FIGURES 1–4, that the cross-sectional area of the inlet aperture 5 of the chute is small compared to the ground area covered by the object being protected (to wit, the cylindrical vessel 2 in FIGURES 1–4, and the supporting structure with equipment in FIGURES 10 and 11).

Figure 12:
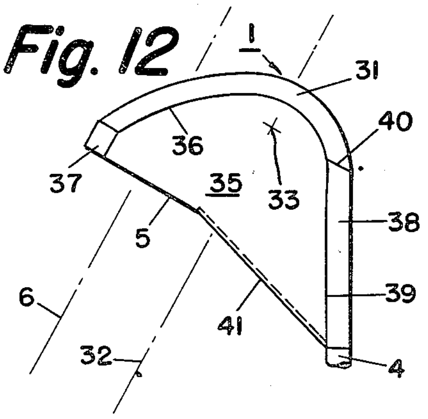
FIGURES 12–14 are views illustrating the details of a basic form of chute utilized in the invention.
Figure 13:
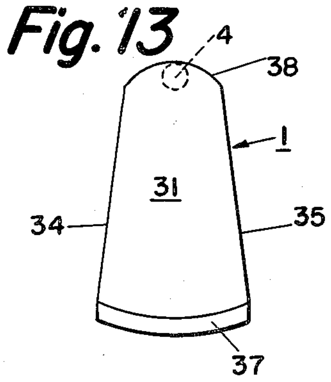
Figure 14:
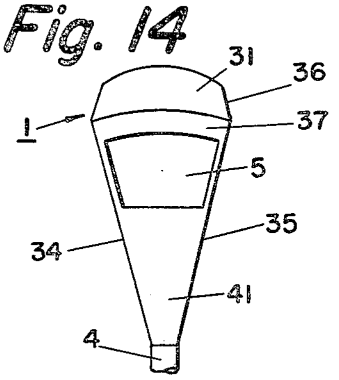

The details of construction of the basic chute 1 may be better understood by referring to FIGURES 12, 13, and 14, to which reference will now be made. FIGURE 12 is a side elevation of the chute, FIGURE 13 is a plan view, looking down on the basic chute, and FIGURE 14 is a front elevation thereof. The proportions of the chute 1 shown in FIGURES 12, 13, and 14 are based upon the following set of conditions, which are given herewith only by way of example: vertical distance, nozzle to chute, 100 feet; horizontal distance, nozzle to object, 50 feet; nozzle diameter, 1½ inches; water pressure at the nozzle, 100 p.s.i.g.

The chute 1, which can be formed from sheet metal or other suitable material, is hollow and has several intersecting faces. If all of its faces were planar, it could be termed a polyhedron; however, three of its faces are nonplanar, so it will be termed a "quasi-polyhedron." Section 31 of the chute 1, on which the stream of water impinges after it passes through the chute inlet aperture, is the parabolic section which, as stated previously, is a section of a paraboloid. The axis of the paraboloid is indicated at 32, while 33 is the focus of the paraboloidal section. The planar faces 34 and 35 form the side boundaries of the chute, and act as confining sections. These faces have a curved edge portion 36 which is the intersection of the confining section and the paraboloidal section 31. Section 37 is an inlet run-in portion which does not conform to the parabolic shape; this section is actually a section of a right circular cylinder and joins the lower edges of faces 34 and 35 to the inlet end of paraboloidal section 31. Section 37 may be considered as being curved in two dimensions, while section 31 is curved in three dimensions.

Section 38 is a reducing section which changes the shape and size of the opening inside the chute at the rear from that of the paraboloidal section 31 to that of the circular outlet aperture 4. Section 38, like section 37, is curved in two dimensions and is a section of a right circular cylinder. Thus, the three faces 31, 37, and 38 of the quasi-polyhedral chute 1 are non-planar. Another edge portion 39 of faces 34 and 35 is straight; this is the intersection of the confining and reducing sections 34 and 38, respectively. The curved edge 40 is the intersection of the paraboloidal and reducing sections 31 and 38, respectively. The front closure plate 41 is planar and its edges form an isosceles trapezoid, its two equal sides joining the faces 34 and 35, respectively. The lower end of front plate 41 (see FIGURE 14) is joined onto and helps define the outlet aperture 4, as do also the lower ends of faces 34 and 35 and the lower end of reducing section 38, previously referred to. The upper end of plate 41 defines one edge (the lower lip) of the chute inlet aperture 5, the opposite edge of this aperture being defined by one end of the run-in section 37; the sides of inlet aperture 5 are of course defined by the respective side faces 34 and 35.

The inlet aperture 5 of the chute 1 is planar and, when the chute is mounted in its operative position adjacent the object to be protected, the plane of this aperture is higher than or above the horizontal plane at the outlet aperture 4. This is the reason for the bottom edges of side faces 34 and 35 each being formed by two intersecting straight lines, rather than by a single straight line.

Line 6 represents the axis of the water stream, at the point of entry of the same into the hollow guiding member 1, and particularly into the guiding member inlet aperture 5. It may be noted that the chute inlet aperture 5 faces downwardly (and also somewhat outwardly) when the chute 1 is in its operative position, adjacent the object to be protected (in which position it is shown in FIGURE 12). It may also be noted that the stream of water 6 is projected upwardly and inwardly (with respect to the protected object) into the inlet aperture 5, and that the water impinges on the paraboloidal section 31 and is then guided to flow downwardly and inwardly (with respect to the protected object) toward and into the chute outlet aperture 4, from whence it flows into the distribution pipe or pipes. The guiding to the outlet aperture 4 of the stream of water projected into the inlet aperture 5 is accomplished with a minimum of spatter, because of the paraboloidal shape of the chute section 31. It may be noted that the hollow guiding member is imperforate (being closed in on all sides), except for the inlet and outlet apertures 5 and 4, respectively.

The plane of the inlet aperture 5 is normal to the axis 6 of the water stream, at the point of entry of the latter into the inlet aperture; this may be seen from FIGURE 12. It is desired to be pointed out that the axis 32 of the paraboloidal section passes below the lower lip (that is, the lip thereof formed by front plate 41) of the chute inlet aperture 5; in other words, the axis 32 of the paraboloid intersects the lower bounding face of the guiding member at a point within the confines of plate 41, this point thus being located between the inlet aperture 5 and the outlet aperture 4. It is further pointed out that the axis 32 of the paraboloid is substantially parallel to the axis 6 of the stream, at the point of entry of the latter into the chute inlet aperture 5.

For the conditions used in determining the proportions of the chute 1 of FIGURES 12–14, the following critical values were assumed or calculated: angle of the end of the "good" stream with the horizontal, 60°; diameter of the chute outlet aperture, eight inches; distance of the axis 32 of the parabola below the lower lip of the chute inlet aperture 5, twelve inches; height of the chute inlet aperture 5, approximately five feet; width of the chute inlet aperture, approximately five feet.

It may be desirable to cover the inlet aperture 5 with a large-mesh screen, which serves to keep birds, as well as foreign or extraneous matter, out of the chute when it is in its elevated, operative position. If this is done, maintenance will be eliminated, and at the same time, the screen will not interfere noticeably with the use of the chute for water guiding purposes, when the latter becomes necessary.

FIGURES 12–14 illustrate the form of the chute which can best be called the "basic form." This is the form which would be used when the chute is located on a structure (as in FIGURES 10 and 11), or when it is located directly in front of a tall vessel (as in FIGURES 1 and 2).

Figure 15:
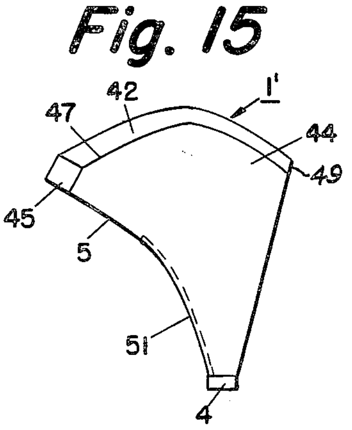
FIGURES 15–17 are views similar to FIGURES 12–14, but illustrating a modified form of chute.
Figure 16:
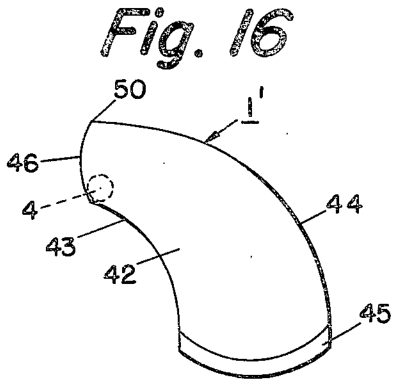
Figure 17:
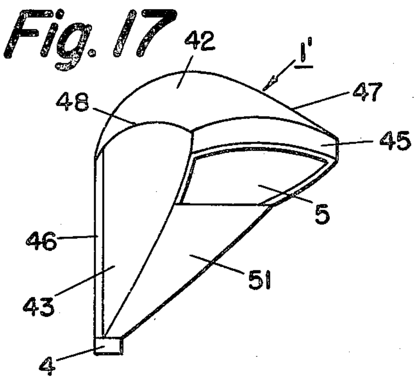

There is a modification of this basic form which would be used when it is more convenient to locate the chute directly on the side wall of a tall cylindrical vessel (as in FIGURES 3 and 4). This modified chute 1′ is illustrated in FIGURES 15, 16, and 17. FIGURE 15 is a side elevation of the modified chute, FIGURE 16 is a plan view, looking down on the chute, and FIGURE 17 is a front elevation thereof. The conditions for determining the proportions of the chute 1′ illustrated in FIGURES 15–17 are the same as stated above for chute 1, in FIGURES 12–14. In addition, the chute 1′ is to be curved, to fit on the side wall of a vertical cylindrical vessel ten feet in outside diameter.

The way in which the basic form is modified will now be described. First, one edge of the outlet aperture is moved so that it will be in the same vertical plane, parallel to the axis of the parabola, as is the one edge of the inlet aperture. Thus, the confining surface becomes vertical. Second, the confining surface, which has been moved into a vertical plane in "first" above, is then curved to fit the surface of the cylindrical vessel. Third, all the points on the chute of the basic design as modified by "first" above are then relocated to bear the same relation to what is now a curved confining surface, as these same points bear to the flat confining surface in "first" above.

Now referring to FIGURES 15–17, numeral 42 denotes the distorted paraboloidal section of the chute 1′, generated as previously described. This is the section of chute 1′ on which the stream of water impinges, after it passes through the chute inlet aperture. The inner confining surface is denoted by 43, this surface being curved so as to match the curvature of the cylindrical vessel, and thus being adapted to fit directly onto the vessel's outer surface. The outer confining surface of the chute 1′ is indicated at 44. Section 45 is the inlet run-in. The reducing section 46 reduces the opening inside the chute at the rear from that of the paraboloidal section 42 to that of the outlet aperture 4.

The numeral 47 denotes the intersection of the paraboloidal and outer confining sections 42 and 44, respectively. Likewise, 48 is the intersection of the paraboloidal and inner confining sections 42 and 43, respectively. Numeral 49 denotes the intersection of the paraboloidal and reducing sections 42 and 46, respectively. Numeral 50 denotes the intersection of the outer confining and reducing sections 44 and 46, respectively. The inlet aperture is 5, while the front closure plate is denoted by 51.

It is believed that the construction of the modified chute 1′ will be readily understood from the foregoing description and from the details of the manner in which the basic chute design is modified to form the modified chute 1′.

The invention claimed is:

1. A system for protecting an elevated object from damage by fire, comprising a hollow guiding member mounted in an elevated position adjacent the object to be protected, said member having an enlarged inlet aperture open to the atmosphere and a restricted outlet aperture, the cross-sectional area of said inlet aperture being small compared to the ground area covered by said object; an elevated distribution pipe coupled to said outlet aperture to receive water flowing therethrough, said pipe being mounted adjacent to the external surface of said object and having a plurality of openings therein, the arrangement being such that water received by said pipe will flow therethrough but will emerge from such openings and form a curtain of water on the external surface of said object; and means for projecting a high pressure stream of water in the form of an atmospheric jet into said inlet aperture.

2. A system in accordance with claim 1, wherein said inlet aperture faces downwardly when said member is in position adjacent said object, and wherein the atmospheric jet of water is projected upwardly into said inlet aperture.

3. A system in accordance with claim 1, wherein the surface of the guiding member upon which the atmospheric jet of water impinges, after passing through said inlet aperture, is a section of a paraboloid.

4. A system in accordance with claim 1, wherein said inlet aperture faces downwardly when said member is in position adjacent said object, wherein the atmospheric jet of water is projected upwardly into said inlet aperture, and wherein the surface of the guiding member upon which the atmospheric jet of water impinges, after passing through said inlet aperture, is a section of a paraboloid.

5. A system in accordance with claim 4, wherein the axis of the paraboloid intersects the lower bounding face of said member at a point located between said inlet and outlet apertures.

6. A system in accordance with claim 1, wherein the surface of the guiding member upon which the atmospheric jet of water impinges, after passing through said inlet aperture, is a section of a paraboloid, the axis of the paraboloid being substantially parallel to the axis of the jet, at the point of entry of the latter into the inlet aperture.

7. A system in accordance with claim 1, wherein the plane of said inlet aperture is normal to the axis of the atmospheric jet, at the point of entry of the latter into the inlet aperture, and wherein the surface of the guiding member upon which the atmospheric jet of water impinges, after passing through said inlet aperture, is a section of a paraboloid, the axis of the paraboloid being substantially parallel to the axis of the jet, at the point of entry of the latter into the inlet aperture.

8. A system as defined in claim 1, wherein said inlet aperture faces downwardly when said member is in position adjacent said object, wherein the atmospheric jet of water is projected upwardly into said inlet aperture, wherein said outlet aperture and said pipe are located below said inlet aperture when said member is in its operative position, and wherein said pipe is mounted near the top of said object.

9. A system as defined in claim 1, wherein said inlet aperture faces downwardly when said member is in position adjacent said object, wherein the atmospheric jet of water is projected upwardly into said inlet aperture, wherein said outlet aperture and said pipe are located below said inlet aperture when said member is in its operative position, wherein said pipe is mounted near the top of said object, and wherein the openings in said pipe are located at the bottom thereof.

10. In combination with an elevated object desired to be protected from damage by fire: a hollow guiding member mounted adjacent the top of said object, said member having an inlet aperture facing downwardly and open to the atmosphere, and having also an outlet aperture, but being otherwise imperforate, the cross-sectional area of said inlet aperture being small compared to the ground area covered by said object; a distribution pipe mounted adjacent to the external surface of said object near the top thereof and coupled to said outlet aperture to receive water flowing therethrough, said pipe having a plurality of openings therein through which water supplied to such pipe may emerge; and means for projecting a high pressure stream of water in the form of an atmospheric jet upwardly into said inlet aperture.

11. The combination defined in claim 10, wherein the openings in said pipe are located at the bottom thereof.

12. The combination defined in claim 10, wherein said outlet aperture and said pipe are located below said inlet aperture, with said pipe being below said outlet aperture.

13. The combination defined in claim 10, wherein said outlet aperture is below said inlet aperture, wherein said pipe is below said outlet aperture, and wherein the openings in said pipe are located at the bottom thereof.

References Cited in the file of this patent

UNITED STATES PATENTS

| | | |
|---|---|---|
| 558,653 | Miller | Apr. 21, 1896 |
| 1,291,926 | Kleucker | Jan. 21, 1919 |
| 1,360,260 | Benson | Nov. 30, 1920 |
| 1,620,142 | Thompson | Mar. 8, 1927 |
| 1,978,502 | Moller | Oct. 30, 1934 |
| 2,140,744 | Hirsch | Dec. 20, 1938 |
| 2,144,062 | Hunneman | Jan. 17, 1939 |
| 2,772,743 | Eggleston | Dec. 4, 1956 |